2,448,834

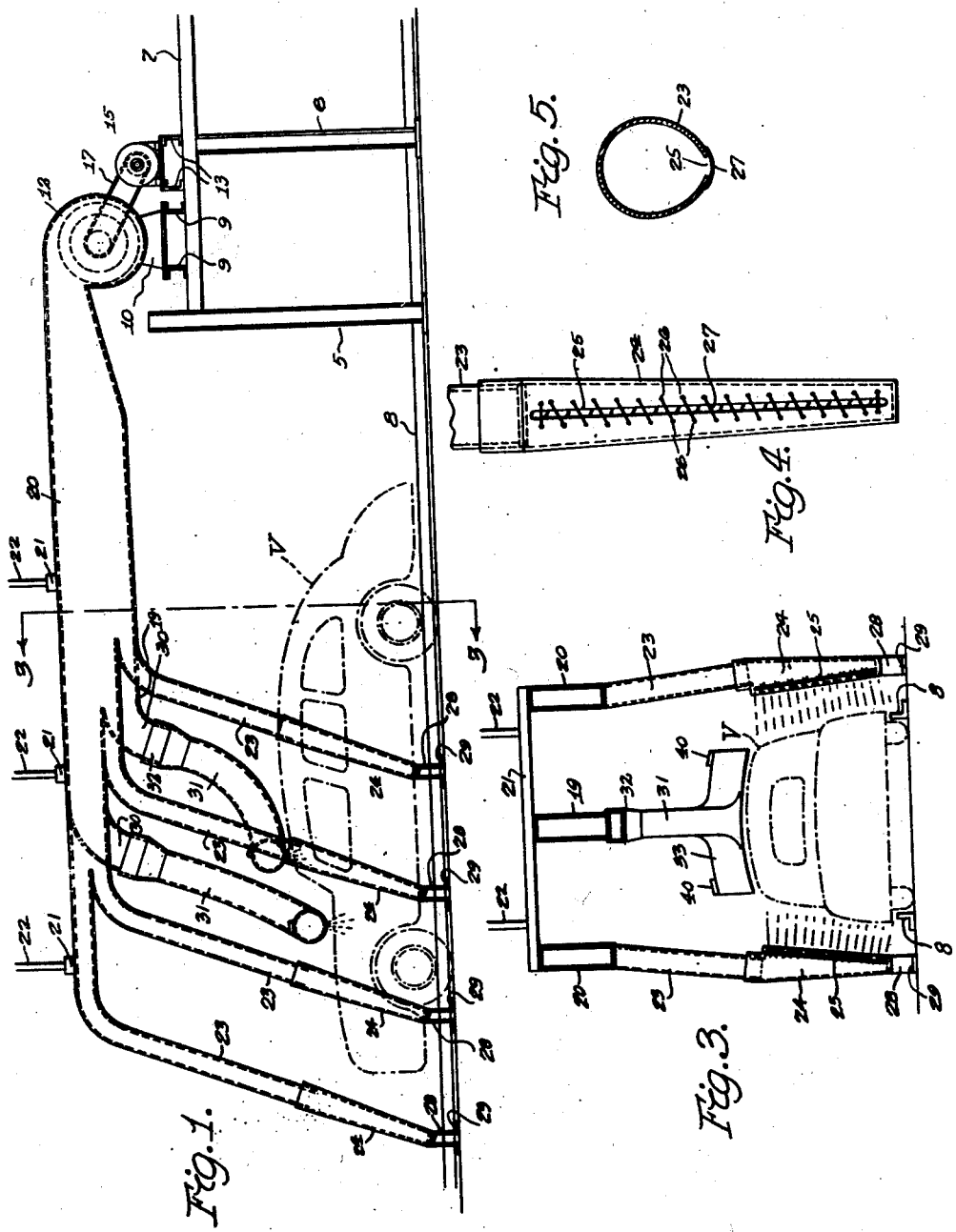
Sept. 7, 1948. L. J. ROUSSEAU 2,448,834
MOTOR VEHICLE DRYING APPARATUS
Filed June 30, 1945 2 Sheets-Sheet 1
INVENTOR
Leo J. Rousseau
BY
Barthel + Bugbee
ATTORNEYS Sept. 7, 1948. L. J. ROUSSEAU 2,448,834
MOTOR VEHICLE DRYING APPARATUS
Filed June 30, 1945 2 Sheets-Sheet 2
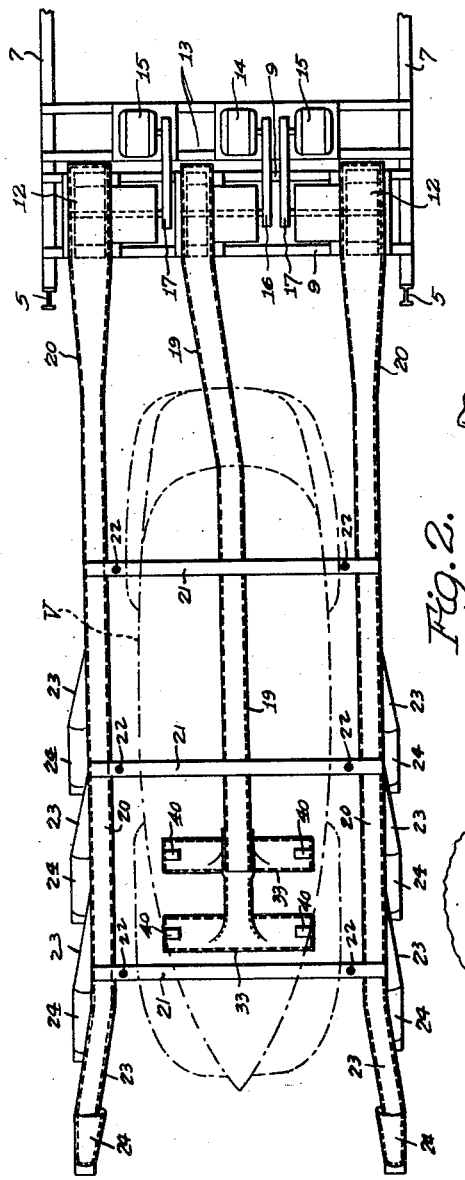
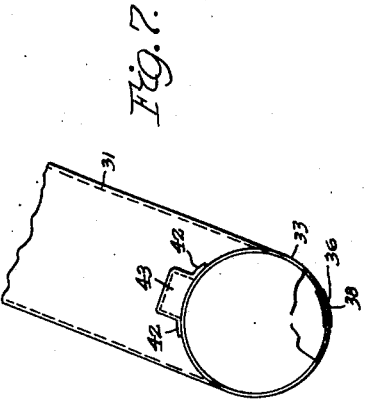
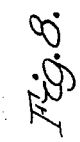
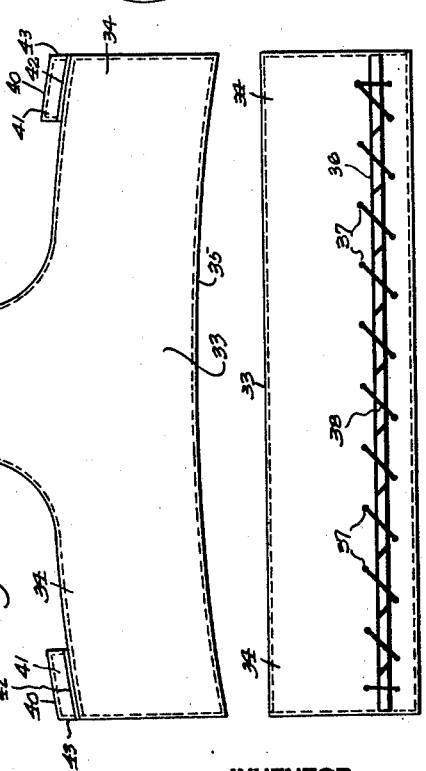
INVENTOR
Leo J. Rousseau
BY
Barthel + Bugbee
ATTORNEYS Patented Sept. 7, 1948

UNITED STATES PATENT OFFICE 2,448,834

MOTOR VEHICLE DRYING APPARATUS

Leo J. Rousseau, Grosse Pointe, Mich., assignor, by mesne assignments, to Minit-Man, Inc., Detroit, Mich., a corporation of Michigan Application June 30, 1945, Serial No. 602,585

12 Claims. (Cl. 34—243)

The present invention relates to drying apparatus, and more particularly, to a drying apparatus for use in conjunction with a vehicle washing and cleaning apparatus for drying vehicles and the like after they have been washed and scrubbed by being passed through said washing apparatus.

The primary object of the invention is to provide a drying apparatus for motor vehicles which will completely dry the vehicle in a comparatively short period of time and will remove the wash water from the surfaces of the vehicle while the vehicle is being conveyed along a pathway.

Another object of the invention is to provide a drying apparatus for motor vehicles which is arranged following a vehicle washing and cleaning apparatus so that the vehicle will be completely dried by a series of blasts of air directed against the surface of the vehicle and at an angle in a direction opposite to the direction in which the vehicle is being conveyed along the pathway.

Another object of the invention is to provide a drying apparatus for motor vehicles and the like in which a series of flexible air conducting members are arranged above the pathway along which the motor vehicles are conveyed so that the flexible air conducting members will conform to the contour of the top surfaces of the vehicle and remove moisture therefrom as the vehicle passes therebeneath.

Another object of the invention is to provide an apparatus for drying motor vehicles as they are conveyed along a pathway including a series of spray pipes or conduits having air nozzles inclined downwardly along each side of the pathway at a compound angle, said nozzles having air outlet openings directed downwardly, inwardly and rearwardly relatively to the direction of travel of the vehicle along the vehicle pathway so that a series of blasts of air will be directed downwardly, inwardly and rearwardly against the sides of the vehicle whereby to sweep the water downwardly and rearwardly off the vehicle and thereby dry the various surfaces of the vehicle.

Another object of the invention is to provide a flexible conduit for conducting air over the surface of a motor vehicle or the like during its travel along a prearranged pathway, said conduit having a nozzle which is provided with an elongated slot or nozzle opening so arranged as to direct a series of air blasts downwardly and in a direction opposite to the direction of vehicle travel along said pathway whereby the elongated slot will not be closed when the flexible conduit is in contact with the surface of the vehicle being dried.

Another object of the invention is to provide an apparatus for drying vehicles such as motor cars and the like which includes an air conduit or pipe formed of flexible material and of an inverted T-shaped appearance having an elongated slot extending along the head portion thereof which is held in shape by lacing to provide a relatively narrow slot for the passage of air, said conduit being of such a shape as to swing freely above the vehicle surface and said slot being disposed so that the air may pass therethrough and be directed downwardly on the vehicle surface.

Another object of the invention is to provide a drying apparatus for drying motor vehicles in which the inverted T-shaped air conduit is weighted at the end portion of its head so that the air conduit will be urged into contact or closely spaced relation with the surface of the vehicle, whereby the air blast or jet will be presented to said surface so that the blast of air will entirely remove the moisture therefrom as well as any remaining particles of dirt and foreign matter.

Another object of the invention is to provide a drying apparatus for motor vehicles including an inverted T-shaped conduit formed of flexible material and having an elongated slot in the head portion thereof so arranged as to properly space the slot from the surface of the vehicle when the T-head is in contactual engagement with the vehicle surface so that said slot will not be completely closed, the slot being so arranged that the blast of air will be presented in closely spaced relation with the vehicle surface to produce the most efficient drying of the surface. Thus, the blast of air will strike the surface of the vehicle at a point close to the slot or T-head where the velocity of the air is greatest and completely remove moisture as well as dirt particles therefrom.

Another object of the invention is to provide a vehicle drying apparatus which may be used with the vehicle washing and scrubbing apparatus shown and described in my co-pending application Serial No. 547,837, filed August 3, 1944, and which is an improvement on the drying apparatus for motor vehicles shown in my co-pending application Serial No. 550,241 filed August 19, 1944, which became U. S. Patent No. 2,440,157, issued April 20, 1948. The drying apparatus of the present application is intended to be used in conjunction with the washing apparatus in the first-mentioned application.

Other objects and advantages of the invention will become apparent during the course of the following description of the accompanying drawings, wherein:

Figure 1 is a side elevational view of the improved drying apparatus showing the manner in which the same is arranged for drying a vehicle as it moves along a pathway;

Figure 2 is a top plan view of the drying apparatus showing the manner in which the air nozzles are arranged on each side of the pathway and disposed at a compound angle and further showing the arrangement of the flexible air conduits for directing a blast of air downwardly, inwardly and rearwardly in a direction opposite to the direction of vehicle travel, upon the hood and top of the vehicle;

Figure 3 is a vertical cross-sectional view taken on line 3—3 of Figure 1 looking in the direction of the arrows and showing various structural details and the arrangement of the various ducts or passageways for feeding or supplying the nozzles with air under pressure;

Figure 4 is a side elevational view of one of the flexible air nozzles showing the manner in which the slot therein is held in position and against separation by suitable lacing;

Figure 5 is a transverse horizontal cross-sectional view through the flexible air nozzle of Figure 4 showing the same slightly enlarged to illustrate various details with relation to the slot and the lacing therefor;

Figure 6 is an enlarged fragmentary front elevational view of the inverted T-shaped duct or conduit for directing a blast of air onto the top surface of the hood and body of the vehicle;

Figure 7 is an enlarged fragmentary end elevational view of the flexible duct or conduit of Figure 6 showing a portion thereof broken away to illustrate the position of the nozzle slot and the manner in which the same is laced and held against separation; and Figure 8 is a rear elevational view of the inverted T-shaped conduit of Figures 6 and 7 further illustrating the manner in which the elongated slot therein is held against separation by means of lacing extending along the edges thereof.

In the drawings, attention is first directed to Figures 1 and 2 wherein there is shown a framework including uprights 5 and 6 connected by longitudinally extending beams or the like as at 7. The framework extends along both sides of a vehicle pathway formed by guide rails 8 located on the floor of the garage or building in which the vehicle drying apparatus is installed, and the uprights 5 and 6 are disposed on opposite sides of these guide rails. It is intended and proposed to employ the same frame structure as is shown in my co-pending application Serial No. 547,837, filed August 3, 1944 for Motor vehicle cleaning apparatus, the present framework forming an addition or extension to the framework shown therein. As illustrated in Figures 1 and 2, the top rails or beams 7 of the frame structure are provided with pairs of transversely extending beams 9 having the bases 10 of a series of air blowers 11 and 12 mounted thereon. The air blower 11 is located centrally or between the blowers 12 for supplying air under pressure to the inverted T-shaped air conduit while the blowers 12 are arranged to supply air under pressure to the flexible conduits or nozzles disposed at each side of the vehicle pathway.

Mounted adjacent the pair of transversely extending beams 9 is a pair of transversely extending beams 13 having suitable platforms thereon for supporting electric motors 14 and 15 which are adapted to be drivingly connected to the respective air blowers 11 and 12 by means of drive belts or the like as at 16 and 17.

The fan casings of the blowers 11 and 12 are provided with the usual air inlets and the outlets thereof are provided with air conduits 19 and 20 which are connected together by transversely extending bars 21 supported from the ceiling or other support by suspension brackets 22.

The air conduits 20 extend along each side of the vehicle pathway or guide tracks 8 and have their ends formed to provide a series of downwardly inclined air conduits 23 which are arranged to extend on a compound angle and preferably on a compound angle extending in a direction opposite to the direction of vehicle travel and inwardly toward the central portion of the conveyor pathway.

The lower ends of the branch pipes or conduits 23 are provided with flexible nozzles 24 which are slipped over the lower end of the pipes or conduits 23 and fastened in place by suitable clamping means, not shown. An elongated slot or nozzle opening 25 is formed in each of the flexible nozzles 24 and is directed downwardly, inwardly and rearwardly relatively to the direction of travel of the vehicle along the vehicle pathway so as to direct a blast of air downwardly, inwardly and rearwardly against the sides of the vehicle from opposite sides of the vehicle pathway. A series of apertures 26 are formed in the flexible nozzle 24 adjacent the edges of the slot 25 on opposite sides thereof for receiving a lacing or tying element 27 as shown clearly in Figure 4 to prevent separation of the edges of said slot when air under pressure is forced therethrough. The lower ends of the flexible nozzles 24 are affixed to floor brackets 28 by means of rivets or the like and said floor brackets have their flange portions 29 secured to the floor of the garage or other building in which the apparatus is installed, by means of anchor bolts.

The air conduit or duct 19 has its free end similarly divided to form branch pipes 30 and said branch pipes are adapted to receive inverted T-shaped air conduits 31 which are formed of flexible material such as canvas or duck or any other suitable fabric possessing flexible characteristics and impregnated with a liquid or air-proofing substance. One end of the inverted T-shaped air conduit is enlarged as at 32 for being fitted over the branch pipes 30 so as to be retained in place by suitable fastening means such as a circular pipe clamp (not shown). The lower T-head end 33 of the T-shaped head 33 and wing extensions 34 are of cylindrical cross-section and are likewise formed of flexible material such as canvas or duck. The lower peripheral surface of the T-head end of the T-shaped conduit is arcuately curved as at 35 to conform to the shape or contour of the top surfaces of the vehicle hood and body. Extending longitudinally on the underside of the head end of the T-shaped conduit is an elongated slot or nozzle opening 36 which is arranged slightly rearward of the center of the head so as to direct a blast of air downwardly and rearwardly in a direction opposite to the direction of vehicle travel.

In order to prevent the edges of the slot 36 from separating when air under pressure is applied to the inverted T-shaped conduit, a series of apertures 37 is formed in the material along the sides of the slot for receiving a lacing cord 38. The apertures 37 in the inverted T-shaped conduit as well as the apertures 26 in the nozzle 24 will be provided with suitable grommets to prevent tearing of the flexible fabric adjacent the edges of the slot 36 and 25.

The wing extensions 34 are provided adjacent their ends with pockets 40 for receiving lead weights 41 so as to hold the inverted flexible conduits against vertical movement by the reaction force of the air blast striking the surfaces of the vehicle. The pockets 40 are provided with wing portions 42 which are stitched or otherwise secured to the top peripheral surface of the wing extensions 34 and have their outer ends closed as at 43 while their inner ends may be opened to facilitate insertion and removal of weights of various sizes.

In operation, the electric motors 14 and 15 are energized by being connected to a suitable source of electricity so as to operate the fan blowers 11 and 12. The motor vehicle V is then passed along the pathway 8 and conveyed therealong by means of a chain conveyor (not shown). Initially, the vehicle V will pass through the washing and scrubbing apparatus shown in my co-pending application Serial No. 547,837, filed August 3, 1944, and will then pass between the angularly mounted drying nozzles 24. The blast of air from the nozzles 24 will be directed downwardly, inwardly and rearwardly against the sides of the vehicle in a direction opposite to the direction of vehicle travel whereby to sweep the water downwardly and rearwardly off the vehicle so as to insure proper drying of the side surfaces of the vehicle as the vehicle moves slowly between the nozzles 24. This arrangement of the nozzles produces the new result of an air blast sweeping downward in a direction inclined toward the bottom of the vehicle, so that the water on the sides of the vehicle is blown downward as well as rearward toward the lower edge of the body. This action, in effect, "squeegees" the water off the sides of the vehicle body in a downwardly and rearwardly inclined direction so as to aid and accelerate the effect of gravity in draining the water off the sides of the vehicle body, and thereby removing the water from the body in the most rapid manner as well as speeding up the drying of any residue of water remaining on the body.

Simultaneously, the blast of air from the inverted T-shaped conduit 31 will be directed rearwardly and downwardly from the nozzle slot 36 in a direction opposite to the direction of vehicle travel and downwardly over the hood surface and top surface of the vehicle so as to remove all moisture and wash water therefrom. When the vehicle V finally emerges, it is completely dried except for a slight amount of moisture on the window panels which is easily removed manually.

In actual practice, as a result of the air pressure therein and the reaction to the blast of air upon the vehicle top the inverted T-shaped conduits 31 have a tendency to float so that the entire weight thereof is not imposed on the vehicle top during the travel of the vehicle therebeneath. Also, it has been found that the arrangement of the slot or nozzle opening 36 in the inverted T-shaped conduit 31 is arranged so as to drive the water or moisture rearwardly along the top and hood surfaces of the vehicle by reason of the fact that the blast of air impinges against said surfaces in close spaced relation from the nozzle slot. This condition produces the most efficient surface drying since the velocity of the air is greater in the immediate vicinity of the nozzle slot.

It is to be understood that the form of the invention herewith shown and described is to be taken as a preferred embodiment thereof and that various changes may be made in the shape, size and arrangement of parts without departing from the spirit of the invention or the scope of the subjoined claims.

What I claim is:

1. In a motor vehicle cleaning apparatus with a vehicle pathway along which vehicles are adapted to be conveyed, a vehicle drying apparatus comprising a supporting structure mounted adjacent said pathway, a series of air conduits supported by said supporting structure and extending to the opposite sides of said pathway, elongated air discharge nozzles connected to said air conduits and arranged along the sides of said pathway and an elongated flexible conduit arranged above said pathway for directing blasts of air in a direction opposite to the direction of vehicle travel along said pathway, and air blower mechanism connected to said air conduits for supplying air to said air conduits, the flexible conduit extending above said pathway being of inverted T-shaped construction with the head thereof provided with an elongated slot to provide an elongated air jet orifice.

2. In a motor vehicle cleaning apparatus with a vehicle pathway along which vehicles are adapted to be conveyed, a vehicle drying apparatus comprising a supporting structure mounted adjacent said pathway, a series of air conduits supported by said supporting structure and extending to the opposite sides of said pathway, elongated air discharge nozzles connected to said air conduits and arranged along the sides of said pathway and an elongated flexible conduit arranged above said pathway for directing blasts of air in a direction opposite to the direction of vehicle travel along said pathway, and air blower mechanism connected to said air conduits for supplying air to said air conduits, the flexible conduit extending above the pathway being of inverted T-shaped construction with the head portion thereof arcuately curved to conform to the curvature of the top surfaces of the vehicle body structure.

3. In a motor vehicle cleaning apparatus with a vehicle pathway along which vehicles are adapted to be conveyed, a vehicle drying apparatus comprising a supporting structure mounted adjacent said pathway, a series of air conduits supported by said supporting structure and extending to the opposite sides of said pathway, elongated air discharge nozzles connected to said air conduits and arranged along the sides of said pathway and an elongated flexible conduit arranged above said pathway for directing blasts of air in a direction opposite to the direction of vehicle travel along said pathway, and air blower mechanism connected to said air conduits for supplying air to said air conduits, the flexible conduit extending above the pathway being of inverted T-shaped construction and provided in the head portion thereof with an elongated nozzle orifice which is arranged rearwardly of the vertical center of said flexible conduit to direct an air blast rearwardly in said direction opposite to the direction of vehicle travel.

4. In a motor vehicle cleaning apparatus with a vehicle pathway along which vehicles are adapted to be conveyed, a vehicle drying apparatus comprising a supporting structure mounted adjacent said pathway, a series of air conduits supported by said supporting structure and extending to the opposite sides of said pathway, elongated air discharge nozzles connected to said air conduits and arranged along the sides of said pathway and an elongated flexible conduit arranged above said pathway for directing blasts of air in a direction opposite to the direction of vehicle travel along said pathway, air blower mechanism connected to said air conduits for supplying air to said air conduits, said flexible conduit arranged above said pathway being of inverted T-shaped construction having an elongated nozzle orifice in the lower head portion, and means for urging the end of said head portion downwardly toward a vehicle being conveyed along said pathway.

5. In a motor vehicle cleaning apparatus with a vehicle pathway along which vehicles are adapted to be conveyed, a vehicle drying apparatus comprising a supporting structure mounted adjacent said pathway, a series of air conduits supported by said supporting structure and extending to the opposite sides of said pathway, elongated air discharge nozzles connected to said air conduits and arranged along the sides of said pathway and an elongated flexible conduit arranged above said pathway for directing blasts of air in a direction opposite to the direction of vehicle travel along said pathway, air blower mechanism connected to said air conduits for supplying air to said air conduits, said flexible conduit arranged above said pathway being of inverted T-shaped construction having an elongated nozzle orifice in the lower head portion, and means for urging the end of said head portion downwardly toward a vehicle being conveyed along said pathway, said last-named means including a weight member removably secured to the end of said head portion.

6. In a motor vehicle cleaning apparatus with a vehicle pathway along which vehicles are adapted to be conveyed, a vehicle drying apparatus comprising a supporting structure mounted adjacent said pathway, a series of air conduits supported by said supporting structure and extending to the opposite sides of said pathway, elongated air discharge nozzles connected to said air conduits and arranged along adjacent said pathway for directing blasts of air in a direction opposite to the direction of vehicle travel along said pathway, air blower mechanism connected to said air conduits for supplying air to said air conduits, said flexible conduits extending along said pathway being flexible and provided with elongated slots, and lacing extending across said slots to retain the same in shape against the air force created by said air blower mechanism.

7. In a motor vehicle cleaning apparatus with a pathway along which a vehicle is adapted to be conveyed, a vehicle drying apparatus comprising a series of air conduits arranged above said pathway, air blower mechanism connected to one end of said air conduits, a series of branch pipes extending downwardly and outwardly from at least two of said air conduits on each side of said pathway, elongated flexible nozzle members mounted on the lower ends of said branch pipes having longitudinally extending slots therein to provide nozzle orifices extending in a direction opposite to the direction of vehicle movement along said pathway, and a flexible lacing element extending through apertures formed in the flexible nozzle members in spaced relation from the edges of said nozzle orifice for retaining said flexible nozzle member and orifice in its preadjusted shape.

8. In a motor vehicle cleaning apparatus with a pathway along which a vehicle is adapted to be conveyed, a vehicle drying apparatus comprising a series of air conduits arranged above said pathway, air blower mechanism connected to one end of said air conduits, a series of branch pipes extending downwardly and outwardly from at least two of said air conduits one each side of said pathway, elongated flexible nozzle members mounted on the lower ends of said branch pipes having longitudinally extending slots therein to provide nozzle orifices extending in a direction opposite to the direction of vehicle movement along said pathway, a flexible lacing element extending through apertures formed in the flexible nozzle members in spaced relation from the edges of said nozzle orifice for retaining said flexible nozzle member and orifice in its preadjusted shape, and a flexible nozzle member secured to another of said series of air conduits and arranged above said vehicle pathway to direct air blasts downwardly and rearwardly of said vehicle pathway.

9. In a motor vehicle cleaning apparatus with a pathway along which a vehicle is adapted to be conveyed, a vehicle drying apparatus comprising a series of air conduits arranged above said pathway, air blower mechanism connected to one end of said air conduits, a series of branch pipes extending downwardly and outwardly from at least two of said air conduits on each side of said pathway, elongated flexible nozzle members mounted on the lower ends of said branch pipes having longitudinally extending slots therein to provide nozzle orifices extending in a direction opposite to the direction of vehicle movement along said pathway, a flexible lacing element extending through apertures formed in the flexible nozzle members in spaced relation from the edges of said nozzle orifice for retaining said flexible nozzle member and orifice in its preadjusted shape, and a flexible nozzle member secured to another of said series of air conduits and arranged above said vehicle pathway to direct air blasts downwardly and rearwardly of said vehicle pathway, said nozzle orifice being adapted to be adjusted to various widths by adjusting the lacing elements thereof.

10. In a drying apparatus, an air conduit, a blower for supplying air to said air conduit, a nozzle member secured to one end of said air conduit, said nozzle member being formed of a flexible fabric having an elongated orifice therein, and a lacing member extending to and fro across said orifice and through apertures on each side thereof for preventing separation of said orifice when air is forced through said nozzle member by said blower.

11. In a motor vehicle cleaning apparatus with a vehicle pathway along which vehicles are adapted to be conveyed, a vehicle drying apparatus comprising a supporting structure mounted adjacent said pathway, a series of air conduits supported by said supporting structure and extending to the opposite sides of said pathway, elongated air discharge nozzles connected to said air conduits and arranged along the sides of said pathway to discharge air onto the sides of said vehicle, and air blower mechanism connected to said air conduits for supplying air to said air conduits and nozzles, said nozzles having elongated air outlet openings inclined downwardly, inwardly and rearwardly relatively to said pathway for directing blasts of air downwardly and rearwardly upon the sides of said vehicle in a direction opposite to the direction of vehicle travel along said pathway whereby to sweep the water off the sides of said vehicle in a downward and rearward direction.

12. In a motor vehicle cleaning apparatus with a vehicle pathway along which vehicles are adapted to be conveyed, a vehicle drying apparatus comprising a supporting structure mounted adjacent said pathway and extending thereabove, a series of air conduits supported by said supporting structure and extending above and to the opposite sides of said pathway, elongated air discharge nozzles connected to said air conduits and arranged above and along the sides of said pathway to discharge air onto the top and sides of said vehicle, and air blower mechanism connected to said air conduits for supplying air to said air conduits and nozzles, said side nozzles having elongated air outlet openings inclined downwardly, inwardly and rearwardly relatively to said pathway for directing blasts of air downwardly and rearwardly upon the top and sides of said vehicle in a direction opposite to the direction of vehicle travel along said pathway whereby to sweep the water off the top of said vehicle in a rearward direction and also off the sides of said vehicle in a downward and rearward direction.

LEO J. ROUSSEAU.

REFERENCES CITED

The following references are of record in the file of this patent:

UNITED STATES PATENTS

| Number | Name | Date |
|---|---|---|
| 666,638 | Beebe | Jan. 29, 1901 |
| 815,093 | Keeney | Mar. 13, 1906 |
| 1,279,086 | Davoran | Sept. 17, 1918 |
| 1,443,329 | Weigert | Jan. 23, 1923 |
| 1,562,762 | Harris | Nov. 24, 1925 |
| 1,627,841 | Dressler | May 10, 1927 |
| 1,697,879 | Olson | Jan. 8, 1929 |
| 1,805,809 | Day | May 19, 1931 |
| 2,132,303 | Lothrop | Oct. 4, 1938 |
| 2,140,337 | Somes | Dec. 13, 1938 |
| 2,177,016 | Brizard | Oct. 24, 1939 |
| 2,234,697 | Hickman | Mar. 11, 1941 |
| 2,293,316 | Stebbins | Aug. 18, 1942 |
| 2,300,679 | Klein | Nov. 3, 1942 |
| 2,334,854 | Zademach | Nov. 23, 1943 |
| 2,345,636 | Stickler | Apr. 4, 1944 |
| 2,385,962 | Barnett | Oct. 2, 1945 |

FOREIGN PATENTS

| Number | Country | Date |
|---|---|---|
| 673,746 | Germany | Mar. 27, 1939 |